Oct. 7, 1930.　　　　A. SJODIN　　　　1,777,773
TRACTION DEVICE FOR VEHICLE DRIVING WHEELS
Filed April 19, 1928
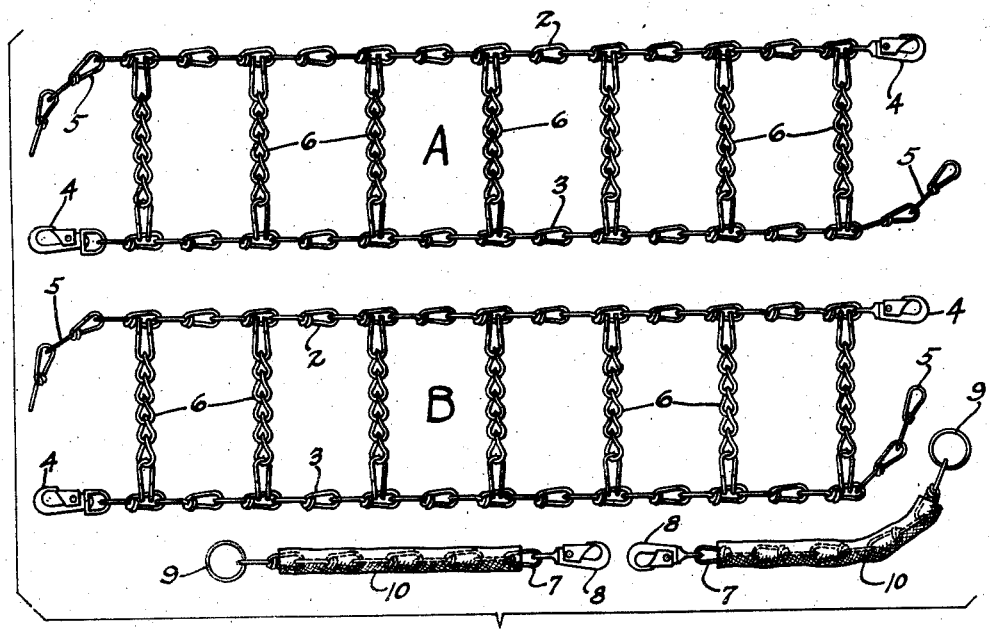
Fig.1
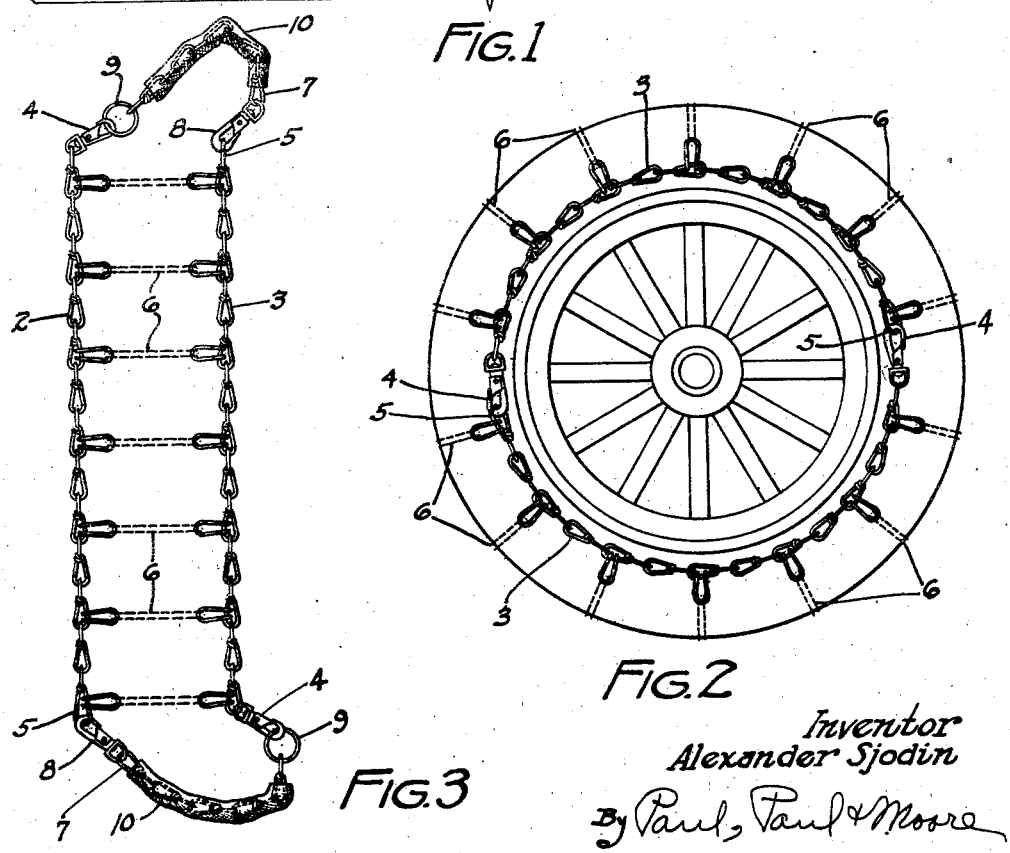
Fig.2
Fig.3
Inventor
Alexander Sjodin
By Paul, Paul & Moore
ATTORNEYS Patented Oct. 7, 1930

1,777,773

UNITED STATES PATENT OFFICE

ALEXANDER SJODIN, OF RUSH CITY, MINNESOTA

TRACTION DEVICE FOR VEHICLE DRIVING WHEELS

Application filed April 19, 1928. Serial No. 271,190.

This invention relates to new and useful improvements in traction devices for vehicle driving wheels, and an object of the invention is to provide such a device comprising two similar half-chains, each having means at the ends thereof for connecting them together to provide a full-circle chain, and two flexible members having means at the ends thereof for connecting them to the ends of the half chains, whereby the device may be used either as a full-circle chain, in which case the flexible members are not used, or one of the half chains may be used independently of the other and secured to the vehicle wheel by means of the flexible members.

A further object of the invention is to provide a tire chain set adapted for use either as a full-circle chain, or a half-chain, and the two half-chain sections being similar in construction and therefore interchangeable, and the flexible members for securing the half-chain sections to the vehicle wheel also being of like structure, thereby providing a tire chain set which may be manufactured at a minimum cost. The present invention is an improvement over the form shown in my prior pending application, Serial No. 252,289, filed February 6, 1928.

Other objects of the invention will appear from the following description and accompanying drawings and will be pointed out in the annexed claim.

In the accompanying drawings, there has been disclosed a structure designed to carry out the various objects of the invention, but it is to be understood that the invention is not confined to the exact features shown as various changes may be made within the scope of the claim which follows.

In the accompanying drawings forming part of this specification;

Figure 1 is a view showing the improved tire chain set;

Figure 2 is an elevational view of a vehicle wheel showing the chain mounted thereon as a full-circle chain; and Figure 3 is a view showing the flexible securing members connected with one of the half-chains.

The novel tire chain set or traction device featured in this invention comprises two half chains A and B, each comprising spaced side chains 2 and 3 of substantially the same length. Each side chain has a suitable snap or hook 4 at one end and an extension 5 at the opposite end, and are connected together by means of suitable cross chains 6.

By reference to Figure 1, it will be noted that the two half-chains A and B are identical in construction and are therefore interchangeable. By means of the snaps and extensions 4 and 5, respectively, provided at the ends of the half-chains, they may be connected together to form a full-circle chain as shown in Figure 2, it being understood, of course that the chains are made in various sizes for different sized tires. The extensions 5 provide means for adjusting or fitting the chains to the tire. In Figure 1, I have shown the extensions 5 as each comprising two links. Obviously, more may be provided, if desired.

The tire chain set also includes a pair of flexible securing members 7, preferably constructed of links similar to the ones from which the side chains 2 and 3 are constructed. Each member 7 has a snap 8 at one end and a ring 9 at the opposite end thereof, so that they may be connected with the ends of one of the half chains as shown in Figure 3. Each member 7 is also preferably encased in a suitable casing or tubing 10, to prevent marring of the vehicle wheel, when the device is used as a half-chain as shown in Figure 3.

I have found this novel tire chain set very useful because it may be used either as a half-chain or a full-circle chain, as may be desired. Because of the device being adapted for use as a half chain, it may readily be mounted upon the vehicle wheel without having to raise the wheel from the ground as, for example, when the wheel has dropped into a depression or mud hole in the ground, in which case, it might be impossible to put on a full-circle chain. If the device is to be used on the vehicle wheels for a longer period of time, it may de desirable to use it as a full-circle chain, as shown in Figure 2, in which case the securing member 7 will not be used. It will therefore be seen that the device is adapted for use either as a half-chain or as a full-circle chain, and it may be quickly and conveniently applied to the wheel without loss of time and without having to raise the wheel from the ground, as is common when using ordinary full-circle chains. In Figure 2, I have shown the device adapted for use as a full-circle chain. In this instance, the extensions 5 have been shortened to adapt the chain to the particular sized tire shown. The extension may readily be shortened by removing some of the links thereof.

I claim as my invention:

A tire chain set comprising part chains each consisting of spaced side-members connected together by suitable cross chains, a hook and a link upon the different side-members at each end of each part chain adapted to be secured to a link and a hook of adjacent side-members of a different part chain, whereby to provide a full-circle chain, the said hooks being attached directly to links of said side-members supporting the outermost of said cross chains, and separable flexible securing members each having a hook at one end thereof and a link at the opposite end thereof for connection to a link and a hook of different side-members of a part chain, said separable flexible securing members being adapted to extend between spokes of a wheel when a part chain only is applied thereto.

In witness whereof I have hereunto set my hand this 13th day of April, 1928.

ALEXANDER SJODIN.